United States Patent
Fukuyama et al.

(10) Patent No.: US 10,644,329 B2
(45) Date of Patent: May 5, 2020

(54) FUEL CELL STACK HAVING A DISPLACEMENT ABSORBING MEMBER DISPOSED IN A COOLING FLUID CHANNEL

(71) Applicants: Nissan Motor Co., Ltd., Kanagawa (JP); NHK Spring Co., Ltd., Kanagawa (JP)

(72) Inventors: Yosuke Fukuyama, Kanagawa (JP); Keita Iritsuki, Kanagawa (JP); Yusuke Terada, Kanagawa (JP); Norihiro Tajima, Kanagawa (JP)

(73) Assignees: Nissan Motor Co., Ltd., Yokohama-shi, Kanagawa (JP); NHK Spring Co., Ltd., Yokohama-shi, Kanagawa (JP)

( * ) Notice: Subject to any disclaimer, the term of this patent is extended or adjusted under 35 U.S.C. 154(b) by 420 days.

(21) Appl. No.: 14/654,987

(22) PCT Filed: Nov. 8, 2013

(86) PCT No.: PCT/JP2013/080231
§ 371 (c)(1),
(2) Date: Jun. 23, 2015

(87) PCT Pub. No.: WO2014/103528
PCT Pub. Date: Jul. 3, 2014

(65) Prior Publication Data
US 2015/0349354 A1    Dec. 3, 2015

(30) Foreign Application Priority Data
Dec. 26, 2012    (JP) .................................. 2012-282310

(51) Int. Cl.
*H01M 8/0206*    (2016.01)
*H01M 8/1004*    (2016.01)
(Continued)

(52) U.S. Cl.
CPC ....... *H01M 8/0206* (2013.01); *H01M 8/0258* (2013.01); *H01M 8/0265* (2013.01);
(Continued)

(58) Field of Classification Search
None
See application file for complete search history.

(56) References Cited

U.S. PATENT DOCUMENTS 5,776,624 A * 7/1998 Neutzler ............. H01M 8/0206
429/210
6,660,419 B1 * 12/2003 Nishida ............... H01M 8/0206
429/210
(Continued)

FOREIGN PATENT DOCUMENTS

EP    1982375 A2    10/2008
EP    2843741 A1    3/2015
(Continued)

OTHER PUBLICATIONS

Fujimoto JP 02160371 Machine Translation.*

*Primary Examiner* — Ula C Ruddock
*Assistant Examiner* — Anna Korovina
(74) *Attorney, Agent, or Firm* — Osha Liang LLP (57) ABSTRACT

A fuel cell stack has a stacked plurality of single cells. Each of the single cells has a membrane electrode assembly, and a pair of separators sandwiching the membrane electrode assembly therebetween. A cooling fluid channel where a cooling fluid flows is formed between adjacent single cells. The fuel cell stack further comprises a displacement absorbing member disposed in the cooling fluid channel to absorb a displacement between the single cells. The displacement absorbing member comprises a channel flow resistance reduction structure that reduces a channel flow resistance of the cooling fluid channel against the cooling fluid.

11 Claims, 9 Drawing Sheets

(51) Int. Cl.
  *H01M 8/2483*  (2016.01)
  *H01M 8/241*   (2016.01)
  *H01M 8/0258*  (2016.01)
  *H01M 8/0267*  (2016.01)
  *H01M 8/0265*  (2016.01)
  *H01M 8/1018*  (2016.01)
  *F28D 21/00*       (2006.01)
  *F28D 9/00*        (2006.01)

(52) U.S. Cl.
  CPC ....... *H01M 8/0267* (2013.01); *H01M 8/1004* (2013.01); *H01M 8/241* (2013.01); *H01M 8/2483* (2016.02); *F28D 9/005* (2013.01); *F28D 2021/0043* (2013.01); *F28F 2240/00* (2013.01); *F28F 2265/26* (2013.01); *H01M 2008/1095* (2013.01)

(56) References Cited

U.S. PATENT DOCUMENTS

| | | | |
|---|---|---|---|
| 6,815,116 B2* | 11/2004 | Lenz | H01M 8/0228 429/468 |
| 6,924,052 B2* | 8/2005 | Lee | H01M 8/04074 429/434 |
| 2002/0061428 A1* | 5/2002 | Ohtani | H01M 8/0206 429/508 |
| 2003/0064277 A1* | 4/2003 | Sugiura | H01M 8/0206 429/434 |
| 2006/0204806 A1* | 9/2006 | Takada | H01M 8/0267 429/434 |
| 2007/0231593 A1* | 10/2007 | Ryu | H01M 8/0247 428/596 |
| 2008/0280177 A1* | 11/2008 | Ose | H01M 8/0247 429/420 |
| 2009/0098432 A1* | 4/2009 | Rosenberg | F28F 13/12 429/444 |
| 2009/0136805 A1 | 5/2009 | Sato et al. | |

FOREIGN PATENT DOCUMENTS

| | | | |
|---|---|---|---|
| EP | 2846385 A1 | 3/2015 | |
| JP | 02160371 A * | 6/1990 | .......... H01M 8/0228 |
| JP | 2006-318863 A | 11/2006 | |
| JP | 4432518 B2 | 3/2010 | |
| JP | 2012-059383 A | 3/2012 | |
| JP | 2012-248460 A | 12/2012 | |

* cited by examiner

FUEL CELL STACK HAVING A DISPLACEMENT ABSORBING MEMBER DISPOSED IN A COOLING FLUID CHANNEL

BACKGROUND

Technical Field

The present invention relates to a fuel cell such as a polymer electrolyte fuel cell (PEFC), particularly to a fuel cell stack that has a cooling fluid channel formed between stacked single cells.

Related Art

One of such fuel cell stacks is described in, for example, Patent Document 1 where it is referred to as a fuel cell. The fuel cell described in Patent Document 1 is composed of a stacked plurality of fuel cells. Each of the fuel cells includes a hydrogen electrode with an uneven cross-section and an oxygen electrode including an drain layer with an uneven cross-section, which are disposed on opposite sides of an MEA (membrane electrode assembly), and further includes flat plate separators disposed on the outer sides of the hydrogen electrode and the oxygen electrodes to form a hydrogen channel and an oxygen channel in the respective interfaces with the electrodes. Furthermore, the fuel cell includes a coolant channel portion at the side of the oxygen electrode.

The coolant channel portion includes two flat plate separators and a pre-compressed plate interposed between them, wherein a coolant channel is formed between the two flat plate separators. The pre-compressed plate has a corrugated cross-sectional shape so as to be elastically deformable in the thickness direction (stacking direction of the stack). The pre-compressed plate distributes a load that is locally generated due to a shape error of the components of the fuel cell so as to apply a uniform load to each component.

CITATION LIST

Patent Literature

Patent Document 1: Japanese Patent No. 4432518

SUMMARY OF INVENTION

However, in the above-described conventional fuel cell stack, while the coolant channel causes a large pressure loss due to the decompressed plate disposed therein, the decompressed plate essentially requires certain spring characteristics. Accordingly, in a conventional fuel cell stack, it may be difficult to decrease the pressure loss of the channel while maintaining the spring characteristics of the decompressed plate.

One or more embodiments of the present invention provides a fuel cell stack that has a coolant channel formed between stacked single cells and includes a displacement absorbing member disposed in the coolant channel, wherein the pressure loss in the coolant channel can be reduced while retaining the spring characteristics of the displacement absorbing member.

The fuel cell stack according to one or more embodiments of the present invention includes a stacked plurality of single cells, each including a membrane electrode assembly and a pair of separators sandwiching the membrane electrode assembly, wherein a cooling fluid channel where a cooling fluid flows is formed between adjacent single cells, and the fuel cell stack further includes a displacement absorbing member disposed in the cooling fluid channel to absorb a displacement between the plurality of single cells. Furthermore, in the fuel cell stack, the displacement absorbing member includes a channel flow resistance reduction structure that reduces the channel flow resistance of the cooling fluid channel against the cooling fluid.

In the fuel cell stack according to one or more embodiments of the present invention, which includes the cooling fluid channel formed between the stacked single cells and the displacement absorbing member disposed in the cooling fluid channel, the pressure loss in the cooling fluid channel can be reduced while maintaining the spring characteristics of the displacement absorbing member.

DETAILED DESCRIPTION

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Hereinafter, a fuel cell stack according to one or more embodiments of the present invention will be described based on the drawings. The fuel cell stack, which includes a stacked plurality of solid polymer electrolyte single cells, is used for, for example, a power source of vehicles such as electric cars.

Figures 1A, 1B:
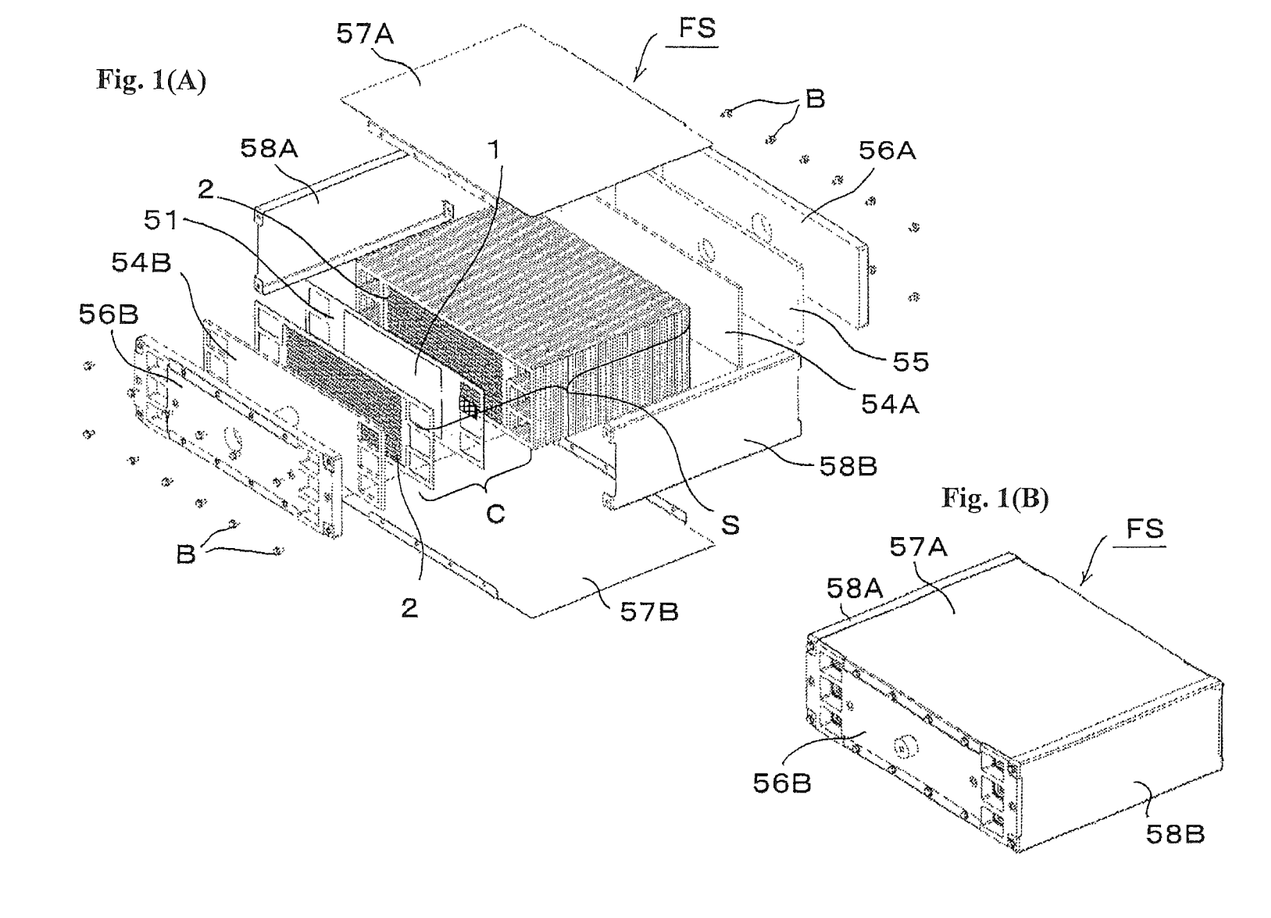
FIG. 1(A) is an exploded perspective view of a fuel cell stack according to one or more embodiments of the present invention.
FIG. 1(B) is a perspective view of the assembled fuel cell stack.

The fuel cell stack FS of FIG. 1(A) includes a plurality of rectangular plate single cells C that are stacked together to form a stack S, an end plate 56A provided on one end in the stacking direction (right end in FIGS. 1(A)-1(B)) of the stack S via a current collector 54A and a spacer 55, and an end plate 56B provided on the other end via a current collector 54B. The fuel cell stack FS further includes fastening plates 57A, 57B provided on opposite surfaces of the stack S corresponding to the long sides of the single cells C (upper and lower surfaces in FIGS. 1(A)-1(B)), and reinforcing plates 58A, 58B provided on opposite surfaces corresponding to the short sides.

Figures 2A, 2B:
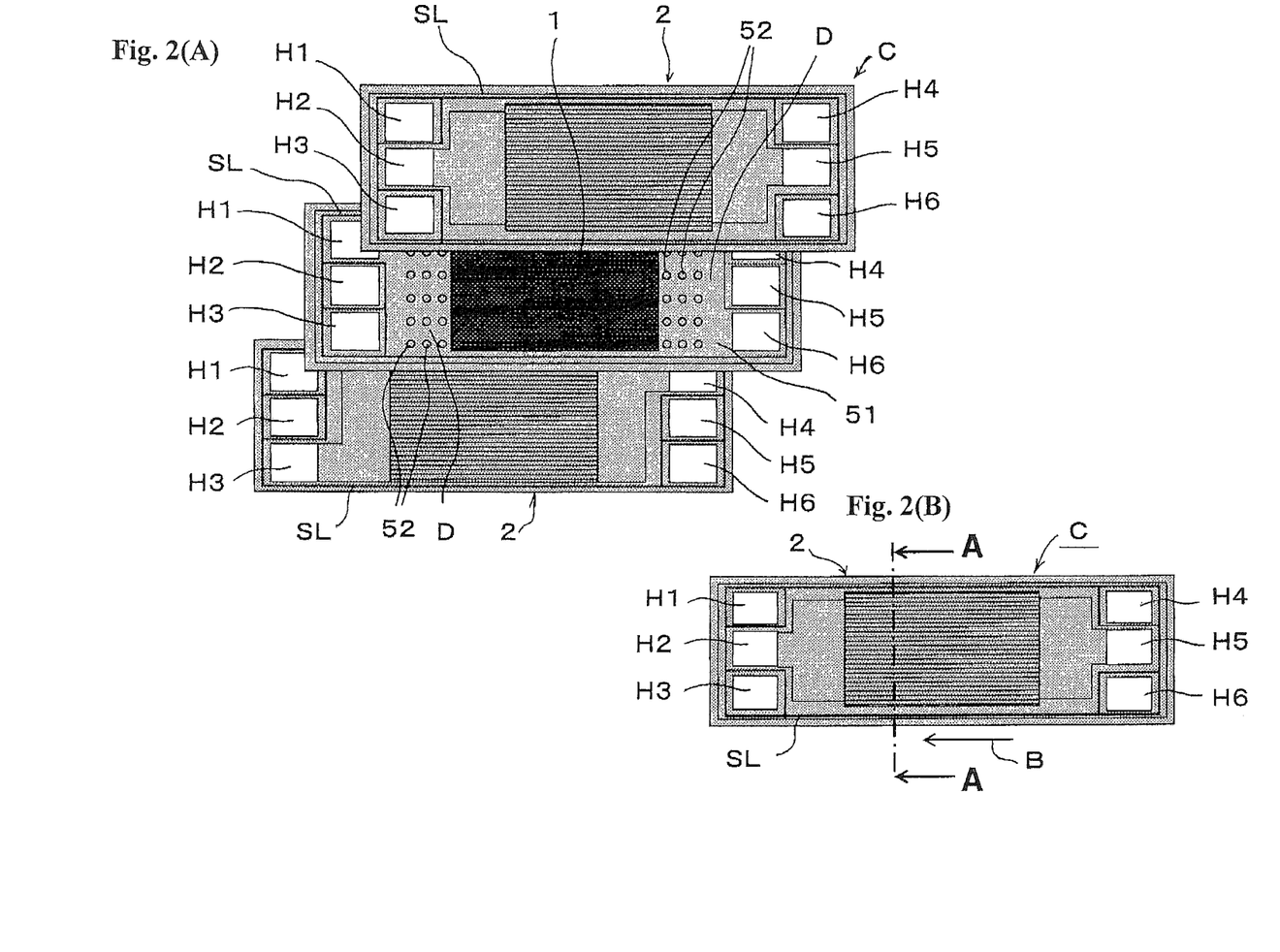
FIG. 2(A) is an exploded plan view of a single cell of the fuel cell stack of FIGS. 1(A)-1(B)
FIG. 2(B) is a plan view of the assembled single cell.

In the fuel cell stack FS, the fastening plate 57A, 57B and the reinforcing plates 58A, 58B are coupled to both of the end plates 56A, 56B by bolts B. As described above, the fuel cell stack FS has a case-integrated structure as illustrated in FIG. 1(B) in which the stack A is restrained and pressed in the stacking direction so that a predetermined contact pressure is applied to each of the single cells C. With this structure, the gas sealing property and the electrical conductivity are maintained at a high level As illustrated in FIGS. 2(A)-2(B), each of the single cells C includes a membrane electrode assembly 1 with a frame 51 along the periphery thereof, a pair of separators 2, 2 that forms cathode and anode gas channels (GC, GA) in the interfaces with the frame 51 and the membrane electrode assembly 1. The single cells C are configured such that gas flows in the opposite directions between the gas channels (GC, GA). The cathode gas is oxygen-containing gas (air), and the anode gas is hydrogen-containing gas.

Figure 3:
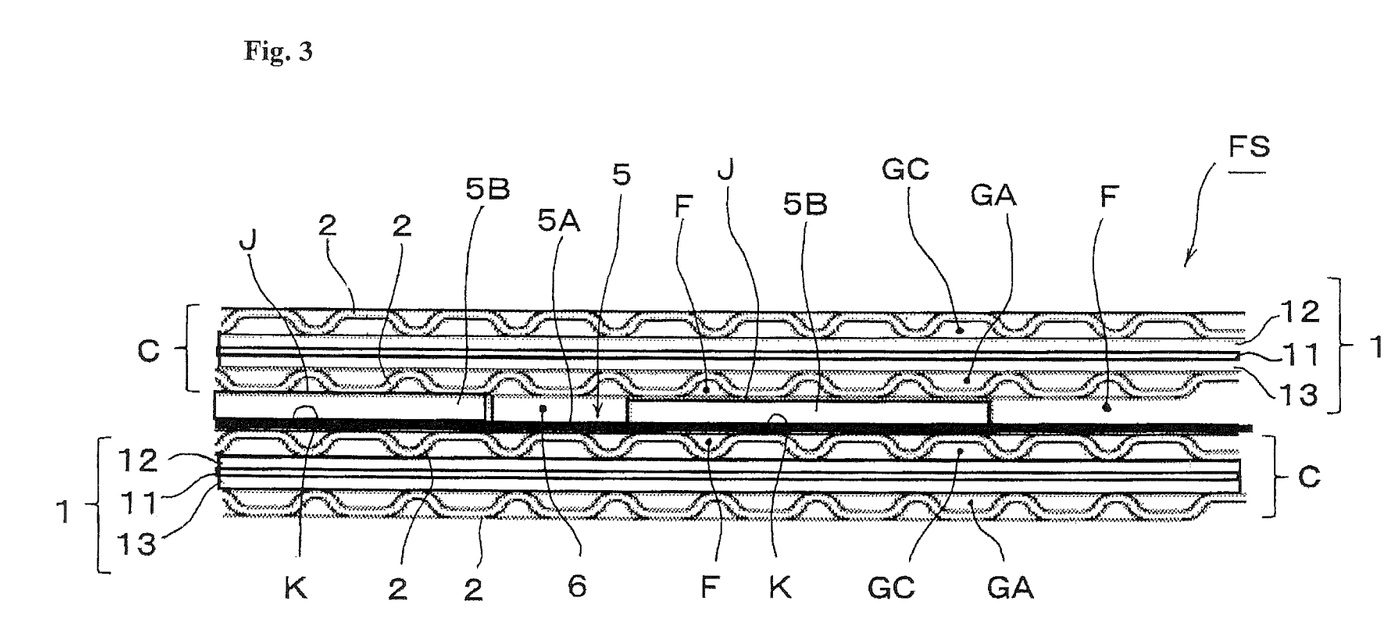
FIG. 3 is a cross sectional view taken along line A-A in FIG. 2(B).

The membrane electrode assembly 1, which is generally referred to as an MEA (membrane electrode assembly), includes an electrolyte layer 11 of a solid polymer, and a cathode layer 12 and an anode layer 13 sandwiching the electrolyte layer 11 as illustrated in FIG. 3. Although not shown in detail in the figure, each of the electrode layers 12, 13 includes an electrode catalyst layer in contact with the electrolyte layer 11 and a gas diffusion layer disposed on the outer side thereof.

The frame 51 is integrally formed with the membrane electrode assembly 1 by resin molding (e.g. injection molding) such that the membrane electrode assembly 1 is positioned in the center. The frame 51 has manifold holes H1 to H3 and H4 to H6 that are arranged such that each short side has three manifold holes. Areas between the manifold holes and the membrane electrode assembly 1 serve as diffuser parts D. The frame 51 and the separators 2, 2 have a rectangular shape with substantially the same dimension.

Further, the frame 51 has a plurality of round protrusions 52 arranged in a matrix on both surfaces within the diffuser parts D as illustrated in FIGS. 2(A)-2(B). When the single cells C deform in the thickness direction due to a change of the membrane electrode assembly 1 over time or the like, the protrusions 52 come in contact with the separators 2, 2 to secure the space where reaction gas flows.

The separators 2 are metal plates in which one plate has reversed faces to those of the other plate. For example, the separators 2 are made of stainless steel and may be formed in any suitable shape by press working. The illustrated separators 2 are formed in an uneven cross-sectional shape at least in the center part corresponding to the membrane electrode assembly 1.

The uneven cross-sectional shape of each of the separators 2 continues in the length direction as illustrated in FIGS. 2(A)-2(B). The apexes of the corrugation are in contact with the membrane electrode assembly 1 while the bottoms of the corrugation form the cathode and anode gas channels (GC, GA) between the bottoms and the membrane electrode assembly 1 as illustrated in the cross sectional view of FIG. 3. Further, each of the separators 2 has manifold holes H1 to H6 at both ends, which are similar to the manifold holes H1 to H6 of the frame 51.

In the frame 51 and the separators 2, 2, the manifold holes H1 to H3 on the left in FIGS. 2(A)-2(B) are configured respectively to supply anode gas (H1), to discharge cooling fluid (H2) and to discharge cathode gas (H3) from the top. These manifold holes are communicated with corresponding manifold holes in the stacking direction to form respective channels. The manifold holes H4 to H6 on the right in FIGS. 2(A)-2(B) are configured respectively to supply the cathode gas (H4), to supply the cooling fluid (H5) and to discharge the anode gas (H6) from the top. These manifold holes are communicated with corresponding manifold holes in the stacking direction to form respective channels.

Further, as illustrated in FIGS. 2(A)-2(B), each of the single cells C includes a gas sealers SL provided between the frame 51 and the separators 2 at the edge part thereof and around the manifold holes H1 to H6. When the plurality of single cells C are stacked, the gas sealer SL is also provided between the single cells C, i.e. between adjacent separators 2. The gas sealers SL airtightly separate the respective interlayers. Further, the gas sealers SL have openings or are selectively removed in the periphery of the manifold holes H1 to H6 so as to allow the cathode gas, the anode gas and the cooling fluid to flow only within the respective flow areas.

The plurality of single cells C are stacked together to form the fuel cell stack FS. As illustrated in FIG. 3, a cooling fluid channel F is formed between adjacent single cells C, and a displacement absorbing member 5 to absorb a displacement between the single cells C is interposed in the cooling fluid channel F.

In the fuel cell stack FS, the displacement absorbing member 5 includes a channel flow resistance reduction structure that reduces the channel flow resistance of the cooling fluid channel F against the cooling fluid. The channel flow resistance reduction structure reduces the channel flow resistance by reducing the projected area of the displacement absorbing member projected in the flowing direction of the cooling fluid at an arbitrary location in the flowing direction or by preventing vortex flow of the cooling fluid, or the like.

In summary, the displacement absorbing member 5 is configured such that a contacting part in contact with the separator 2 moves in the in-plane direction according to a deformation in the thickness direction. As described above with FIGS. 2(A)-2(B) and FIG. 3, in the fuel cell stack FS, the surfaces of the separators 2 facing the cooling to fluid channel F have an uneven cross-sectional shape that continues in the flow direction of the cooling fluid. That is, the continuing direction corresponds to the flow direction of the cooling fluid. Specifically, the flow direction of the cooling fluid corresponds to the horizontal direction in FIGS. 2(A)-2(B) or the direction perpendicular to the paper plane in FIG. 3. In the fuel cell stack FS, the displacement absorbing member 5 is disposed so that the moving direction of the contacting part corresponds to the flow direction of the cooling fluid.

The displacement absorbing member 5 of one or more embodiments of the present invention is made of a thin metal plate. As illustrated in the partial view of FIG. 4(A), a number of spring functional parts 5B are arranged in a matrix on one surface of a base plate 5A. The displacement absorbing member 5 is electrically conductive and thereby also has a function as a connector to electrically connect the single cells C to each other as well as the displacement absorbing function. Each of the spring functional parts 5B has a tongue-shaped cantilever structure with a fixed end K on the base plate 5A and a free tip end J. While the spring functional parts 5B of one or more embodiments of the present invention have a rectangular shape, the shape is not particularly limited.

The displacement absorbing member 5 is configured such that the contacting parts in contact with the separator 2 move in the in-plane direction according to a deformation in the thickness direction. That is, as illustrated in FIG. 4(B), the displacement absorbing member 5 is provided such that the base plate 5A is in contact with the separator 2 of a single cell at one side (lower side in FIGS. 4(A)-4(B)) while the free ends J of the spring functional parts 5B are in contact with the separator 2 of a single cell at the other side. In the displacement absorbing member 5, when the gap between the separators 2, 2 is changed, the spring functional parts 5B swings from the position illustrated by the solid line to the position illustrated by the virtual line (or the reverse direction). As the inclination angle of the spring functional parts 5B changes, the contacting parts of the free ends J in contact with the other separator 2 move in the in-plane direction by the distance L Further, the displacement absorbing member 5 is disposed so that the moving direction of the contacting parts corresponds to the flow direction of the cooling fluid, i.e. the direction indicated by the arrow B in FIGS. 4(A)-4(B). In this regard, the free ends J of the spring functional parts 5B head downstream in the flow direction of the cooling fluid. The spring functional parts 5B have a flat cross-sectional shape in FIGS. 4(A)-4(B), but they may have a suitable cross-sectional shape. For example, when the free ends J are curved so that the contacting parts in contact with the separator 2 are constituted of curved surfaces, they can slide more smoothly with respect to the separator 2.

Furthermore, in the displacement absorbing member 5, the spring functional parts 5B are formed by lancing the base plate A. Accordingly, the base plate 5A has openings 5C corresponding to the spring functional parts 5B. The displacement absorbing member 5 with such configuration can be easily produced from a single sheet by means of press working or the like.

In the above-described displacement absorbing member 5, pathways 6 between the spring functional parts 5B arranged in the direction transverse to the flow direction of the cooling fluid (direction indicated by the arrow B) correspond to the channel flow resistance reduction structure. That is, according to one or more embodiments of the present invention, the pathways 6 correspond to a channel flow resistance reduction structure that reduces the channel flow resistance by reducing the projected area of the displacement absorbing member 5 projected in the flow direction of the cooling fluid in an arbitrary location in the flow direction. In one or more embodiments of the present invention, since the spring functional parts 5B are arranged in a matrix, the pathways 6 continue in the flow direction of the cooling fluid.

The fuel cell stack FS supplies the anode gas and the cathode gas to the membrane electrode assembly 1 through the gas channels GC, GA while allowing the cooling fluid to flow through the cooling fluid channel F between adjacent single cells C, so as to generate electric energy by an electrochemical reaction. In the event of internal thermal expansion of the single cells C or swelling of the membrane electrode assembly 1, the displacement absorbing member 5 absorbs the resultant displacement in the stacking direction.

In the fuel cell stack FS, the displacement absorbing member 5 is interposed in the cooling fluid channel. However, since the displacement absorbing member 5 has the pathways 6 as the channel flow resistance reduction structure for the cooling fluid channel F, the cooling fluid flows smoothly. As a result, the fuel cell stack FS can reduce the pressure loss in the cooling fluid channel F while maintaining the spring characteristics of the displacement absorbing member 5 at a good level, which eventually enables reducing the size and weight of a pump for the cooling fluid.

Furthermore, the fuel cell stack FS employs the channel flow resistance reduction structure (pathways 6) that reduces the channel flow resistance by reducing the projected area of the displacement absorbing member 5 projected in the flow direction of the cooling fluid at an arbitrary location in the flow direction. Therefore, with such a simple configuration, smooth flow of the cooling fluid can be achieved, and the pressure loss in the cooling fluid channel F is reduced.

Furthermore, in the fuel cell stack FS, the surfaces of the separators 2 facing the cooling fluid channel F have an uneven cross-sectional shape that continues in the flow direction of the cooling fluid, the displacement absorbing member 5 includes the contacting portions in contact with the separator 2 configured to move in the in-plane direction according to a deformation in the thickness direction, and the displacement absorbing member 5 is disposed so that the moving direction of the contacting portions corresponds to the flow direction of the cooling fluid. Therefore, in the fuel cell stack FS, the displacement absorbing member 5 is prevented from being partly stuck in the recesses of the separators 2 when it moves in the in-plane direction, and the contact between them is maintained in a good condition. In addition, both surfaces of the separators 2 can be effectively utilized respectively as the gas channel CG (CA) and the cooling fluid channel F. This can reduce the thickness of the single cells C and thus reduce the size of the fuel cell stack FS.

Furthermore, in the fuel cell stack FS, the displacement absorbing member 5 includes a number of spring functional parts 5B that are arranged on one surface of the base plate 5A, and the spring functional parts 5B have a cantilever structure with the fixed proximal end K fixed on the base plate 5A and the free tip end J. Therefore, the fuel cell stack FS can adequately absorb a displacement in the thickness direction with such a simple structure and can be therefore produced at a low cost. Further, in the displacement absorbing member 5, the spring functional parts 5B have a simple shape and can be easily formed at short pitches to decrease the spring stiffness. With such decreased spring stiffness, the displacement absorbing member 5 exhibits spring characteristics that causes small load change in response to a displacement. Even when the displacement absorbing member 5 is deteriorated due to displacements in the compressing direction during operation or time degradation, the deterioration causes small change in surface pressure, and the electrical contact resistance between components is stable.

Furthermore, in the fuel cell stack FS, the spring functional parts 5B of the displacement absorbing member 5 are formed by lancing the base plate 5A. Therefore, as described above, the displacement absorbing member 5 can be easily formed from a single sheet by press working. The lacing for the spring functional parts 5B forms the openings 5C in the displacement absorbing member 5, and the cooling fluid can flow in the vertical direction through the openings 5C. Therefore, this can improve the cooling effect in addition to the reduction of the pressure loss.

Furthermore, in the fuel cell stack FS, the displacement absorbing member 5 is disposed so that the free ends J of the spring functional parts 5B head downstream in the flow direction of the cooling fluid. The spring functional parts 5B inclined toward the flow direction of the cooling fluid prevent vortex flow in the downstream side of the spring functional parts 5B. This can further reduce the pressure loss in the cooling fluid channel F.

In a fuel cell stack FS in which a displacement absorbing member 5 is disposed in a cooling fluid channel F between stacked single cells C, the pressure loss in the cooling fluid channel F due to the displacement absorbing member 5 is contradictory to the spring function of the displacement absorbing member 5 and the electricity conducting function of the displacement absorbing member 5, as a connector between the single cells C. That is, in order to reduce the pressure loss in the cooling fluid channel F, the displacement absorbing member 5 can be formed in a shape and size that can minimize the resistance. However, such a shape and size degrade the spring function and the electricity conducting function of the displacement absorbing member 5.

Thus, in the fuel cell stack FS according to one or more of the above-described embodiments, the displacement absorbing member 5 includes the pathways 6 as the channel flow resistance reduction structure so that it has a reduced projected area projected in the flow direction of the cooling fluid in an arbitrary location in the flow direction. Furthermore, in the displacement absorbing member 5, the moving direction of the contacting portions in contact with the separator 2, which move according to a deformation in the thickness direction, corresponds to the flow direction of the cooling fluid, the spring functional parts 5B has a cantilever structure, the spring functional parts 5B are formed by lancing the base plate 5A so that the openings 5C are formed therein, and the spring functional parts 5B are disposed so that the free ends J head downstream in the flow direction of the cooling fluid.

Therefore, the fuel cell stack FS, in which the displacement absorbing member 5 is disposed in the cooling fluid channel F between the stacked single cells C, achieves both of the reduction in pressure loss in the cooling fluid channel F by means of the displacement absorbing member 5 and the adequate spring function and the adequate electricity conducting function as a connector of the displacement absorbing member 5.

FIGS. 5(A)-5(E) illustrate displacement absorbing members according to embodiments of the present invention, which are a component of the fuel cells stack. FIGS. 5(A)-5(E) illustrate cross-sections viewing in the flow direction of a cooling fluid from the upstream to the downstream. The same reference signs are denoted to similar components as those of the above embodiments, and the detail description thereof is omitted.

The displacement absorbing members 5 of FIG. 5(A) to FIG. 5(E) include a base plate 5A and cantilever spring functional parts 5B disposed on one surface of the base plate 5A. The displacement absorbing members 5 include a channel flow resistance reduction structure that reduces the channel flow resistance by reducing the projected area of the displacement absorbing members 5 projected in the flow direction of the cooling fluid in an arbitrary location in the flow direction. To be more specific, the channel flow resistance reduction structure of one or more embodiments of the present invention is constituted by at least either openings or cutouts formed in the spring functional parts 5B within the areas from free ends J to fixed ends K.

Figure 4A:
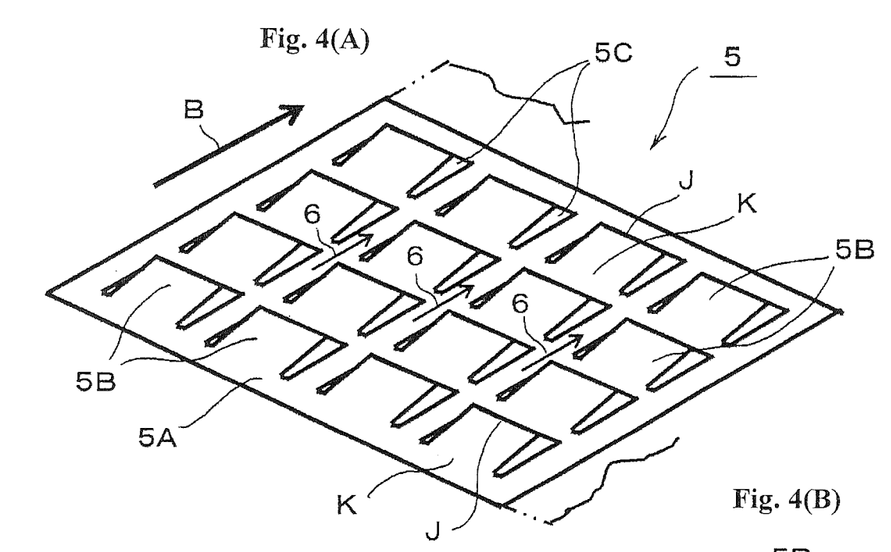
FIG. 4(A) is a perspective view of a displacement absorbing member.
Figure 4B:
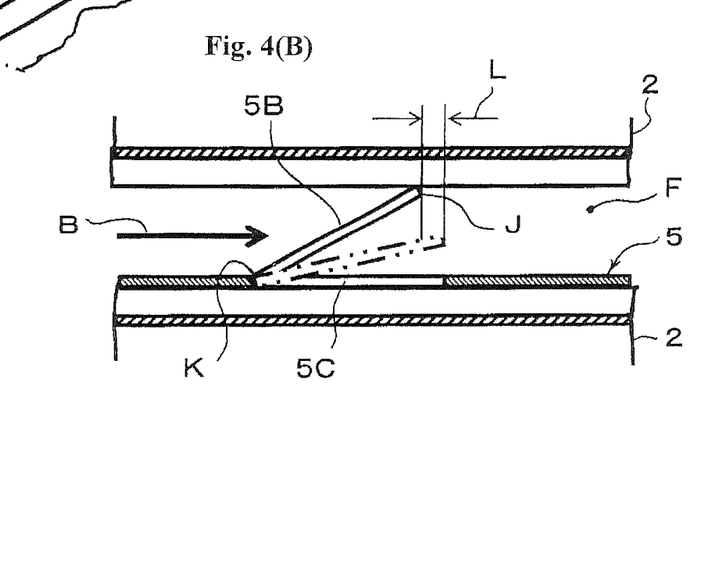
FIG. 4(B) is a cross sectional view around a spring functional part thereof.

The cutouts of one or more embodiments of the present invention refer to portions that are cut out from basic rectangular spring functional parts 5B as illustrated in FIGS. 4(A)-4(B). That is, the cutouts can be formed by removing a part of the spring functional parts 5B after forming them, or the cutouts can be formed simultaneously with forming the spring functional parts 5B by lancing.

Figure 5A:
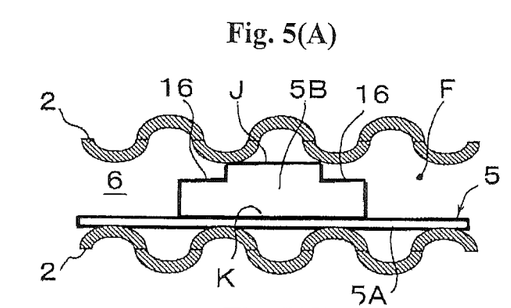
FIGS. 5(A)-5(E) are front views of spring functional parts according to embodiments of the present invention, viewing from the flowing direction of cooling fluid.
Figure 5B:
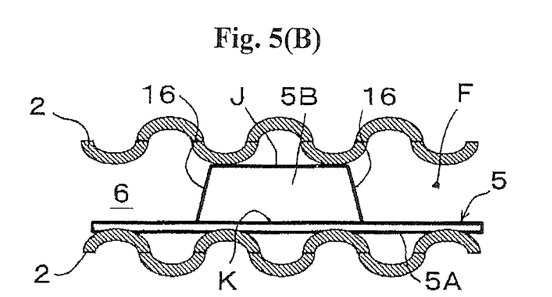

The spring functional parts 5B of FIG. 5(A) or FIG. 5(B) has a width that decreases with the location from the fixed end K toward the free end J. That is, the spring functional part 5B of FIG. 5(A) has rectangular cutouts 16, 16 on both sides including the free end J, and the width decreases stepwise with the location from the fixed end K to the free end J. The spring functional part 5B of FIG. 5(B) has triangular cutouts 16, 16 on both sides including the free end J so that it has a trapezoidal shape as a whole, and the width decreases gradually with the location from the fixed end K to the free end J.

The displacement absorbing members 5 with the above-described spring functional parts 5B can reduce the pressure loss in the cooling fluid channel F by the cutouts 16 expanding the cooling fluid channel F to allow smoother flow of the cooling fluid. Further, the spring functional parts 5B have a width that decreases with the location from the fixed ends K to the free ends J. Therefore, in addition to the reduction in pressure loss, the displacement absorbing members 5 can retain its spring characteristics at a good level since the sufficient width of the spring functional parts 5B is secured at the fixed ends K and a sharp change in strength of the spring material can be thereby prevented.

Figure 5C:
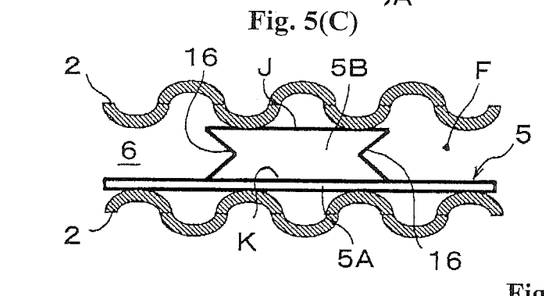
Figure 5D:
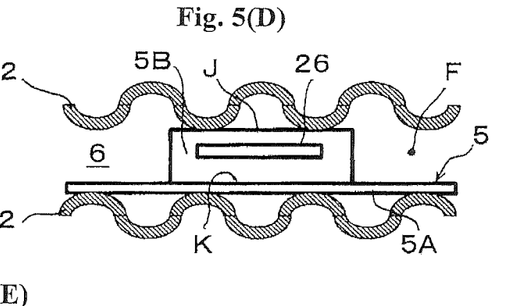

The spring functional parts 5B of FIG. 5(C) and FIG. 5(D) include the channel flow resistance reduction structure provided between the free end J and the fixed end K within the area from the free end J to the fixed end K. In short, the channel flow resistance reduction structure is provided in the middle area excluding the free end J and the fixed end K. The spring functional part 5B of FIG. 5(C) includes triangular cutouts 16, 16 on both sides thereof. The spring functional part 5B of FIG. 5(D) includes rectangular opening 26 in the center thereof.

The displacement absorbing member 5 with the above-described spring functional parts 5B can reduce the pressure loss in the cooling fluid channel F by the cutouts 16 or the openings 26 expanding the cooling fluid channel F to allow smoother flow of the cooling fluid. Further, since the cutouts 16 or the openings 26 are formed between the free ends J and the fixed ends K in the spring functional parts 5B, the displacement absorbing member 5 can secure a sufficient contact area between the free ends J of the spring functional parts 5B and a separator 2. Therefore, the displacement absorbing member 5 can reduce the pressure loss in the cooling fluid channel F without affecting the electrical conductivity.

Figure 5E:
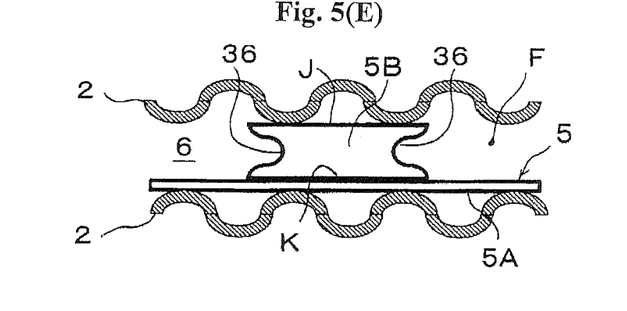

The spring functional part 5B of FIG. 5(E) includes a channel flow resistance reduction structure provided between the free end J and the fixed end K. That is, the spring functional part 5B includes U-shaped cutouts 36, 36 on both sides thereof. The U-shaped cutouts have R-shaped edges so that the cutouts 36 are composed of only curved lines. These cutouts 36 correspond to the channel flow resistance reduction structure that reduces the channel flow resistance by preventing vortex flow of the cooling fluid.

As with the one or more of the above embodiments, the displacement absorbing member 5 with the above-described spring functional parts 5B can secure a sufficient contact area between the free ends J of the spring functional parts 5B and a separator 2 so that it can reduce the pressure loss in the cooling fluid channel F without affecting the electrical conductivity. Further, the cutouts 36 composed of a curved line prevent vortex flow at the downstream side of the spring functional parts 5B, which can further reduce the pressure loss. In particular, when the free ends J of the spring functional parts 5B are arranged to face toward the downstream in the flow direction of the cooling fluid as illustrated in FIG. 4(B), the curved lines of the cutouts 36 follow the flow direction of the cooling fluid. This can prevent vortex flow more effectively.

All of the displacement absorbing members 5 that respectively include the spring functional parts 5B of FIG. 5(A) to FIG. 5(E) can be readily produced from a single sheet material by press molding. Further, as the channel flow resistance reduction structure, these displacement absorbing members 5 include cutouts 16, 36 or the openings 26 as well as the pathways 6 as described in one or more of the above embodiments. Therefore, their functions are combined with each other to provide further reduction of the pressure loss in the cooling fluid channel F.

In the fuel cell stack of one or more of the above-described embodiments, the spring functional parts 5B of the displacement absorbing member 5 have a width that decreases with the location from the fixed ends K to the free ends J, or each of the spring functional parts 5B includes the cutouts 16, 16 or the openings 26 over the area from the free end J to the fixed end K or between the free end J and the fixed end K, or the cutouts 16, 16 or the opening 2 is composed of a curved line. Therefore, as with one or more of the above embodiments, the fuel cell stack achieves both of the reduction of the pressure loss in the cooling fluid channel F by means of the displacement absorbing member 5 and the adequate spring function of the displacement absorbing member 5 and the adequate electricity conducting function of the displacement absorbing member 5 as a connector.

Figure 6A:
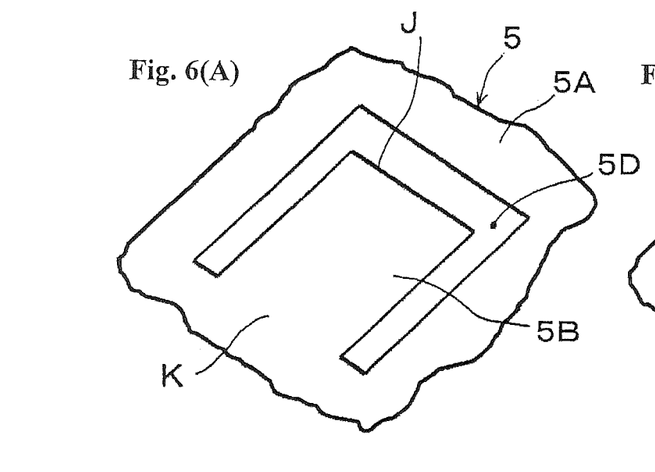
FIG. 6(A) is a perspective view of a spring functional group according to one or more embodiments of the present invention before lancing.
Figure 6B:
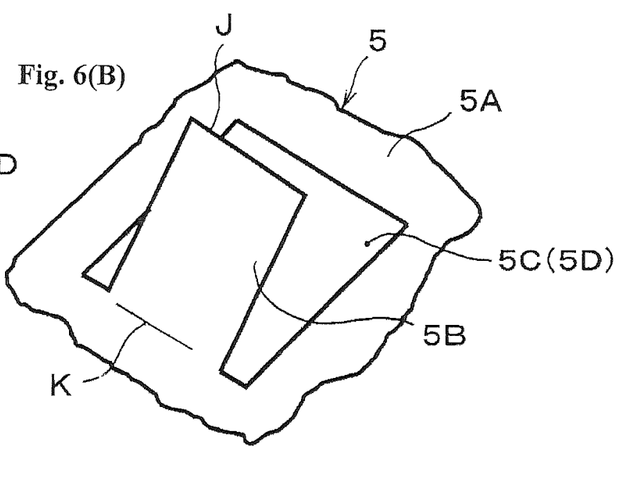
FIG. 6(B) is a perspective view and FIG. 6(C) is a cross sectional view thereof after lancing.
Figure 6C:
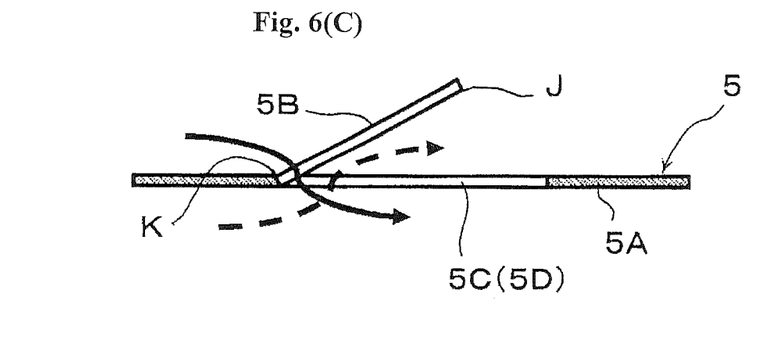

FIGS. 6(A)-6(C) illustrate a displacement absorbing member according to one or more embodiments of the present invention, which is a component of the fuel cell stack. The illustrated displacement absorbing member 5 includes spring functional parts 5B that are formed by lancing a base plate 5A. In particular, as illustrated in FIG. 6(A), blank areas 5D are provided around the spring functional parts 5B, which are formed by lancing the base plate 5A.

The blank areas 5D can be formed by punching at the time of press-molding the displacement absorbing member 5. Accordingly, as illustrated in FIG. 6(B), the displacement absorbing member 5 has openings 5C (including the blank areas) that are slightly larger than the spring functional parts 5B.

The displacement absorbing member 5 with the above-described spring functional parts 5B allows smoother flow of the cooling fluid through the openings 5C. That is, in the previously-described displacement absorbing member 5 with the spring functional parts 5B of FIGS. 4(A)-4(B), the cooling fluid flows up and down through the openings 5C. However, since the width of the spring functional parts 5B is approximately equal to the width of the openings 5C, the cooling fluid goes around the spring functional parts 5B to flow into the openings 5C.

In contrast, in the displacement absorbing member 5 according to one or more embodiments of the present invention, since the width of the openings 5C are greater than the width of the spring functional parts 5B by the width of the blank areas 5D, the cooling fluid readily flow into the openings 5C as illustrated in FIG. 6(C). Therefore, the displacement absorbing member 5 further reduces the pressure loss in the cooling fluid channel F while retaining its spring characteristics at a good level. As with one or more of the previous embodiments, the fuel cell stack with this displacement absorbing member 5 achieves both of the reduction of the pressure loss in the cooling fluid channel F by means of the displacement absorbing member 5 and the adequate spring function of the displacement absorbing member 5 and the adequate electricity conducting function of the displacement absorbing member 5 as a connector.

Figure 7:
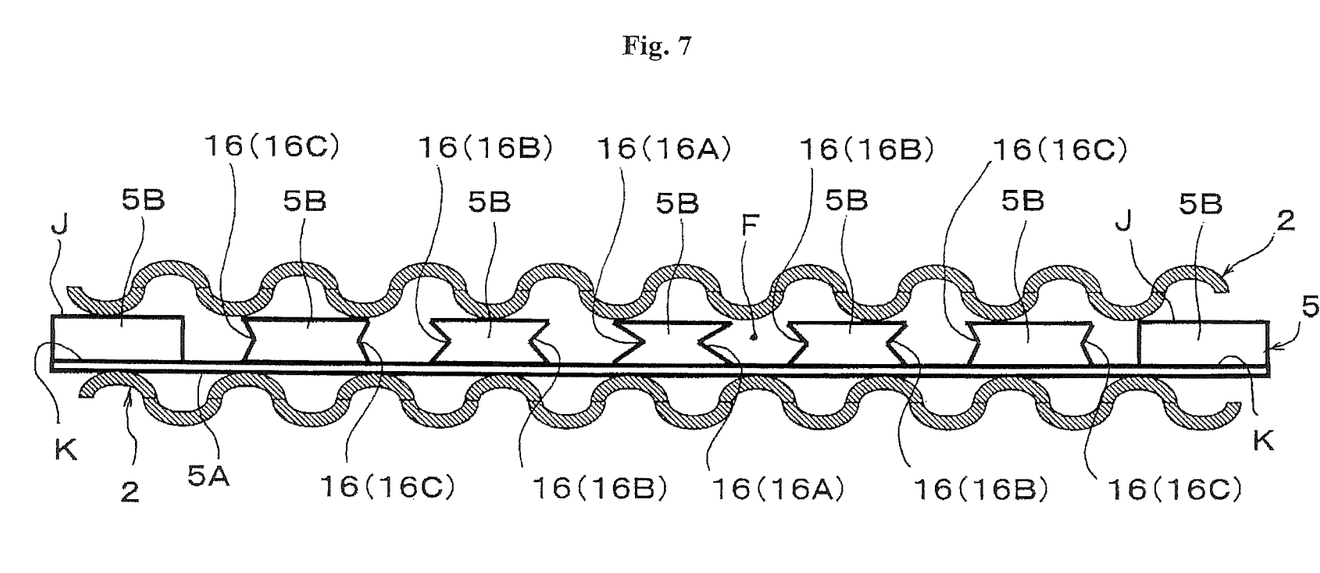
FIG. 7 is a front view of a displacement absorbing member according to one or more embodiments of the present invention, viewing from the flowing direction of cooling fluid.

The displacement absorbing member 5 of FIG. 7 includes spring functional parts 5B with different shapes according to the location in a cooling fluid channel F. In particular, the spring functional parts 5B are disposed so that the channel size is decreased in both side areas of the cooling fluid channel F along the flow direction of the cooling fluid (direction perpendicular to the paper plane in FIG. 7).

Specifically, the displacement absorbing member 5 includes rectangular spring functional parts 5B that are arranged on a base plate 5A, in which some of the spring functional parts 5B have cutouts 16 with a triangular cross-section as the channel flow resistance reduction structure while the other spring functional parts 5B have no cutout.

Further, in the illustrated displacement absorbing member 5, the spring functional parts 5B are arranged in seven rows in the direction transverse to the flow direction of the cooling fluid (horizontal direction in FIG. 7). The spring functional parts 5B with the largest cutouts 16A are disposed in the center, the spring functional parts 5B with cutouts 16B smaller than the center cutouts are disposed in the two rows on both sides thereof, the spring functional parts 5B with further smaller cutouts 16C are disposed in the two rows on both of the further outer sides thereof, and the spring functional parts 5B with no cutout are disposed in the two rows on the outermost sides.

As described above, the size of the cutouts is decreased with the location from the center toward the outer sides of the cooling fluid channel F, and no cutout is formed in the outermost areas. In this way, the displacement absorbing member 5 decreases the channel size in both side areas of the cooling fluid channel F along the flow direction of the cooling fluid.

The displacement absorbing member 5 can adjust the distribution of the cooling fluid by locally changing the channel flow resistance of the cooling fluid by means of the spring functional parts 5B with different shapes disposed according to the location in the cooling fluid channel F. Further, the displacement absorbing member 5 exhibits low channel flow resistance in the center area when the spring functional parts 5B are disposed as illustrated in the figure so as to decrease the channel size of the cooling fluid channel F in the side areas along the flow direction of the cooling fluid. Accordingly, the cooling fluid is more likely to flow in the center area.

Since single cells C have a power generating area of the membrane electrode assembly 1 in the center part as illustrated in FIGS. 2(A)-2(B), the temperature becomes high in the center part during operation. To cope with the high temperature, the displacement absorbing member 5 concentrates the flow of the cooling fluid to the center area so that it can efficiently cool the single cells C. This can also contribute to improving the power generating performance. In this way, as with one or more of the previous embodiments, the fuel cell stack FS achieves both of the reduction of the pressure loss in the cooling fluid channel F by means of the displacement absorbing member 5 and the adequate spring function of the displacement absorbing member 5 and the adequate electricity conducting function of the displacement absorbing member 5 as a connector.

Figure 8:
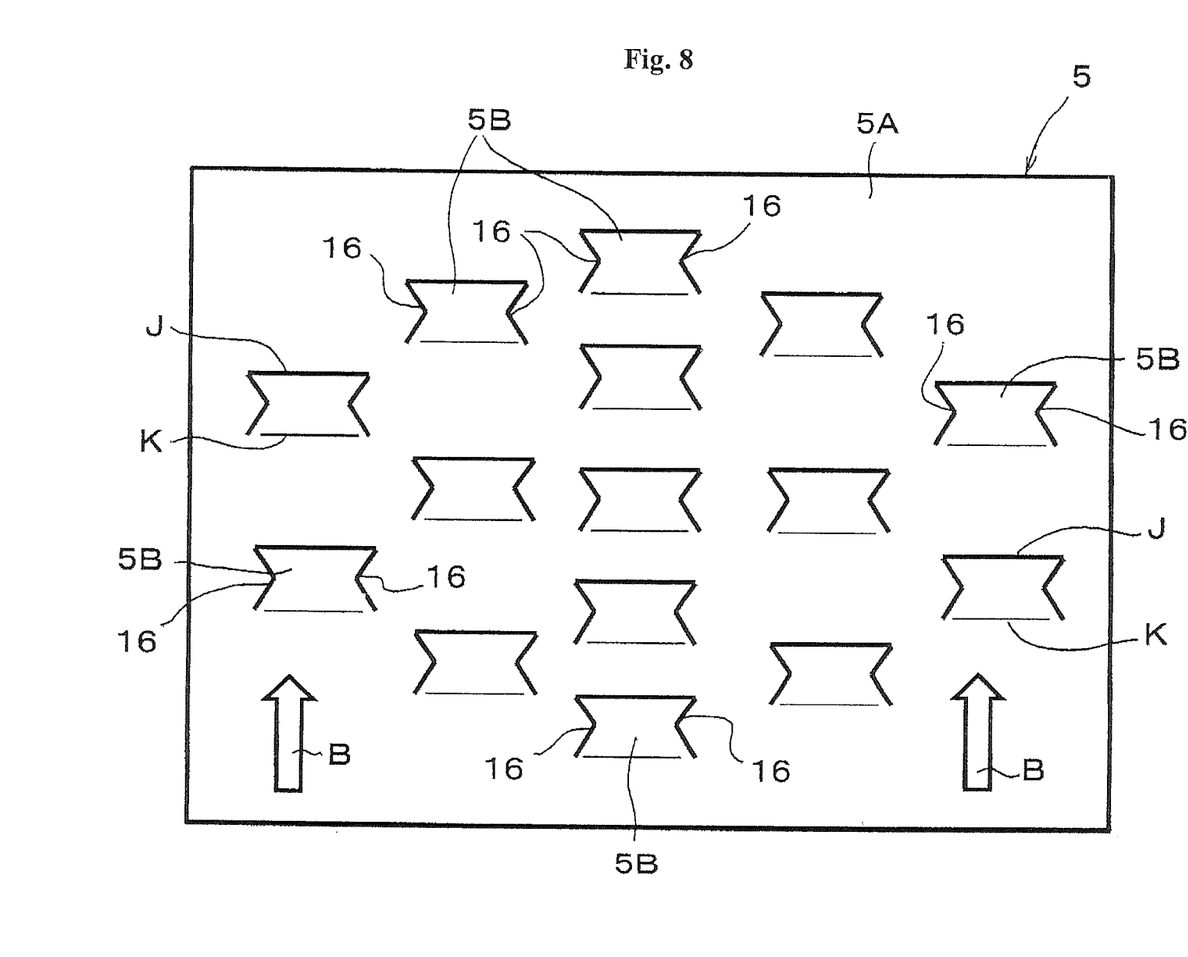
FIG. 8 is a plan view of a displacement absorbing member according to one or more embodiments of the present invention.

The displacement absorbing member 5 of FIG. 8 includes spring functional parts 5B that are disposed at different intervals between adjacent spring functional parts 5B according to the location in a cooling fluid channel F. As with one or more of the previous embodiments, the displacement absorbing member 5 includes spring functional parts 5B with cutouts 16 with a triangular cross-section as the channel flow resistance reduction structure.

In the illustrated displacement absorbing member 5, the spring functional parts 5B are arranged in five rows in the direction transverse to the flow direction of a cooling fluid (shown by the arrows B), in which the intervals between spring functional parts 5B in the respective rows are gradually increased with the location from the center row to the outer rows. Accordingly, in the displacement absorbing member 5, the number of spring functional parts 5 is gradually decreased with the location from the center row to the outer side rows.

As with one or more of the previous embodiments, this displacement absorbing member 5 locally changes the channel flow resistance of the cooling fluid by the spring functional parts 5B disposed at different intervals between adjacent spring functional parts 5B according to the location in the cooling fluid channel F. Therefore, the distribution of the cooling fluid can be adjusted. As with one or more of the previous embodiments, the fuel cell stack FS with this displacement absorbing member 5 achieves both of the reduction of the pressure loss in the cooling fluid channel F by means of the displacement absorbing member 5 and the adequate spring function of the displacement absorbing member 5 and the adequate electricity conducting function of the displacement absorbing member 5 as a connector.

Figure 9A:
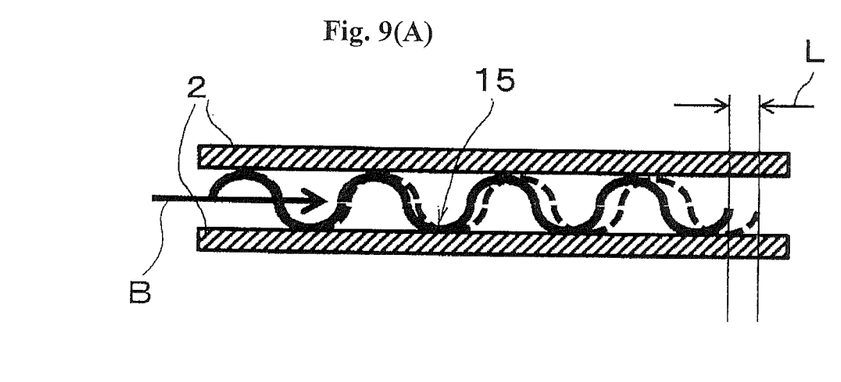
FIG. 9(A) is a cross sectional view and FIG. 9(B) is a perspective view of a displacement absorbing member according to one or more embodiments of the present invention.
Figure 9B:
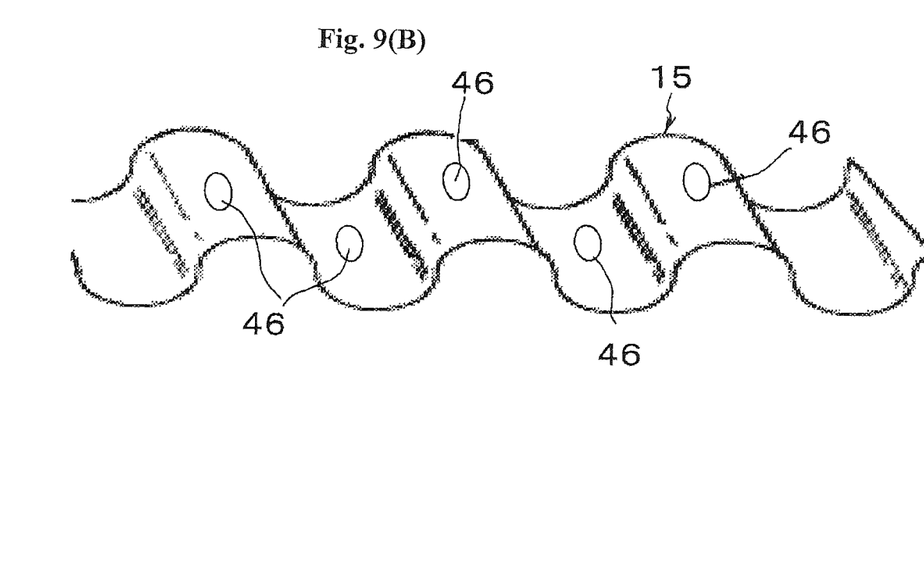

The displacement absorbing member 15 of FIGS. 9(A)-9(B) is constituted by a thin metal plate formed in a corrugated shape. The displacement absorbing member 15 is configured such that the contacting parts in contact with the separators 2 moves in the in-plane direction according to a deformation in the thickness direction. That is, the displacement absorbing member 15 is in contact with the separators 2 of adjacent single cells at the apexes of the corrugation, as shown in FIG. 9(A). When the gap between the separators 2, 2 changes, the displacement absorbing member 15 is collapsed and deformed from the shape shown by the solid line to the shape shown by the virtual line so as to be extended in the direction of the corrugation by the length L. As a result, the contacting parts of the displacement absorbing member 15 in contact with the separators 2 moves in the in-plane direction.

The displacement absorbing member 15 is disposed so that the moving direction of the contacting parts corresponds to the flow direction of cooling fluid, which is the direction of the arrow B in FIGS. 9(A)-9(B). Further, as illustrated in FIG. 9(B), the displacement absorbing member 15 has a plurality of round openings 46 at selected locations. In the displacement absorbing member 15 according to one or more embodiments of the present invention, the openings 46 correspond to the channel flow resistance reduction structure that reduces the channel flow resistance by decreasing the projected area of the displacement absorbing member 15 projected in the flow direction of the cooling fluid in an arbitrary location in the flow direction.

As with one or more of the previous embodiments, in the fuel cell stack with this displacement absorbing member 15, the displacement absorbing member 15 absorbs the resultant displacement in the stacking direction caused by internal thermal expansion of single cells C or swelling of membrane electrode assemblies. Since the displacement absorbing member 15 has the openings 46 as the channel flow resistance reduction structure, it allows smooth flow of the cooling fluid.

In this way, the fuel cell stack reduces the pressure loss of the cooling fluid channel F while retaining the spring characteristics of the displacement absorbing member 15 at a good level, and thereby achieves both of the reduction of the pressure loss in the cooling fluid channel F by means of the displacement absorbing member 5 and the adequate spring function of the displacement absorbing member 5 and the adequate electricity conducting function of the displacement absorbing member 5 as a connector. Furthermore, since the openings 46 are composed of circles, i.e. curved lines, the openings 46 prevent vortex flow at the downstream side thereof. Therefore, the displacement absorbing member 15 can further reduce the pressure loss in the cooling fluid channel.

The configuration of the fuel cell stack is not limited to those of the above-described embodiments, and details of the configuration may be suitably changed without departing from the scope of the present invention. For example, in the fuel cell stack of one or more embodiments of the present invention, the configurations of the above-described embodiments can be combined with each other. Further, a change may be made in the plate thickness and elasticity of the displacement absorbing member, the shape, size, number, arrangement and direction with respect to the flowing direction of the cooling fluid of the spring functional parts of the displacement absorbing member, and the shape, size, number and arrangement of the cutouts or openings, which are the channel flow resistance reduction structure.

With such configuration, the fuel cell stack, in which the displacement absorbing member is disposed in the cooling fluid channel between the stacked single cells, can achieve both of the reduction of the pressure loss in the cooling fluid channel by means of the displacement absorbing member and the adequate spring function of the displacement absorbing member and the adequate electricity conducting function of the displacement absorbing member as a connector.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

C Single cell
F Cooling fluid channel
FS Fuel cell stack
1 Membrane electrode assembly
2 Separator
5, 15 Displacement absorbing member
5A Base plate
5B Spring functional part
5C Opening
5D Blank part
6 Channel (channel flow resistance reduction structure)
16, 36 Cutout (channel flow resistance reduction structure)
26, 46 Opening (channel flow resistance reduction structure)
J Free end of spring functional part
K Fixed end of spring functional part

The invention claimed is:

1. A fuel cell stack, comprising:
a stacked plurality of single cells, each of the single cells comprising a membrane electrode assembly and a pair of separators sandwiching the membrane electrode assembly therebetween; and
a displacement absorbing member comprising a base plate and a plurality of spring functional parts, the base plate comprising two opposite plane surfaces,
wherein the spring functional parts have a cantilever structure comprising a fixed proximal end fixed on the base plate and a free tip end,
wherein a cooling fluid channel where a cooling fluid flows in a flow direction is formed between adjacent single cells,
wherein the displacement absorbing member is disposed in the cooling fluid channel to absorb a displacement between the single cells, and comprises a cutout formed in an area from the free tip end to the fixed proximal end, forming a channel flow resistance reduction structure that reduces a channel flow resistance of the cooling fluid channel against the cooling fluid by preventing vortex flow of the cooling fluid,
wherein the spring functional parts arranged on one of the two opposite plane surfaces have different shapes according to a location in the cooling fluid channel, and
wherein the spring functional parts comprise the cutouts,
wherein the cutouts are smaller in size as the spring functional parts are positioned farther away from a center of the cooling fluid channel in a direction perpendicular to the flow direction and closer to outer sides of the cooling fluid channel in the direction perpendicular to the flow direction, and
wherein channel sizes of outer side areas of the cooling fluid channel in the direction perpendicular to the flow direction are smaller than central areas thereof.

2. The fuel cell stack according to claim 1,
wherein a projected area of the displacement absorbing member projected in the flow direction of the cooling fluid are reduced by the channel flow resistance reduction structure in an arbitrary location in the flow direction.

3. The fuel cell stack according to claim 1,
wherein a surface of the separator facing the cooling fluid channel has an uneven cross-sectional shape that extends in the flow direction of the cooling fluid, and
wherein the displacement absorbing member is configured such that a contacting part in contact with the separator moves in an in-plane direction according to a deformation in a thickness direction, and is disposed so that a moving direction of the contacting part corresponds to the flow direction of the cooling fluid.

4. The fuel cell stack according to claim 2,
wherein a surface of the separator facing the cooling fluid channel has an uneven cross-sectional shape that continues in the flow direction of the cooling fluid, and
wherein the displacement absorbing member is configured such that a contacting part in contact with the separator moves in an in-plane direction according to a deformation in a thickness direction, and is disposed so that a moving direction of the contacting part corresponds to the flow direction of the cooling fluid.

5. The fuel cell stack according to claim 1,
wherein the spring functional parts are formed by lancing the base plate.

6. The fuel cell stack according to claim 5,
wherein blank areas are formed on the base plate along a periphery of the spring functional parts.

7. The fuel cell stack according to claim 1,
wherein the channel flow resistance reduction structure is formed between the free tip end and the fixed proximal end of the spring functional parts.

8. The fuel cell stack according to claim 1,
wherein the spring functional parts have a width that decreases from the fixed proximal end to the free tip end.

9. The fuel cell stack according to claim 1,
wherein the free tip end of the spring functional parts faces toward a downstream of the flow direction of the cooling fluid.

10. The fuel cell stack according to claim 1,
wherein the spring functional parts are disposed at different intervals between adjacent spring functional parts according to a location in the cooling fluid channel.

11. The fuel cell stack according to claim 9,
wherein the channel flow resistance reduction structure comprises a pathway formed between the spring functional parts of the displacement absorbing member.

* * * * *